INVENTORS
RAYMOND I. MEYERS
KENNETH C. KRAMER

INVENTOR.
RAYMON I. MEYERS
KENNETH C. KRAMER
BY

United States Patent Office 3,018,072
Patented Jan. 23, 1962

3,018,072
AIRCRAFT ROLL STABILIZING APPARATUS
Raymond I. Meyers, Rockford, Mich., and Kenneth C. Kramer, Woodland Hills, Calif., assignors to Lear, Incorporated
Filed Sept. 21, 1959, Ser. No. 841,215
4 Claims. (Cl. 244—77)

This invention relates to aircraft control apparatus and, more particularly, to apparatus for controlling the roll of an aircraft. When an aircraft approaches a stall condition, it is desirable to have the wings level so that if the aircraft does stall, it will not be a spinning or tumbling stall. In other words, it is more difficult to pull an aircraft out of a spinning dive than it is to pull an aircraft out of a straight dive.

In the past, automatic controls have been devised which warn the pilot when a stall condition is imminent and he is required to take corrective action and at the same time level the wings.

Other systems have been devised whereby the automatic controls maintain the wings level except in a turn and therefore, if the aircraft were to approach a stall condition while in a turn the automatic leveling is not in effect and hence does not help the pilot.

Therefore, it is an object of this invention to put an artificial feel into the control stick to warn the pilot of an approaching stall condition and also to take corrective action to level the wings but yet allow the pilot to override the automatic corrective action.

Another object of this invention is to provide roll damping means wherein the automatic controls resist roll movement when the aircraft approaches a high rate of roll.

A further object of this invention is to provide roll damping means when the aircraft approaches a stall condition.

Other objects and a better understanding of the invention will become apparent from the following description when taken in conjunction with the drawings, in which.

Figure 1:
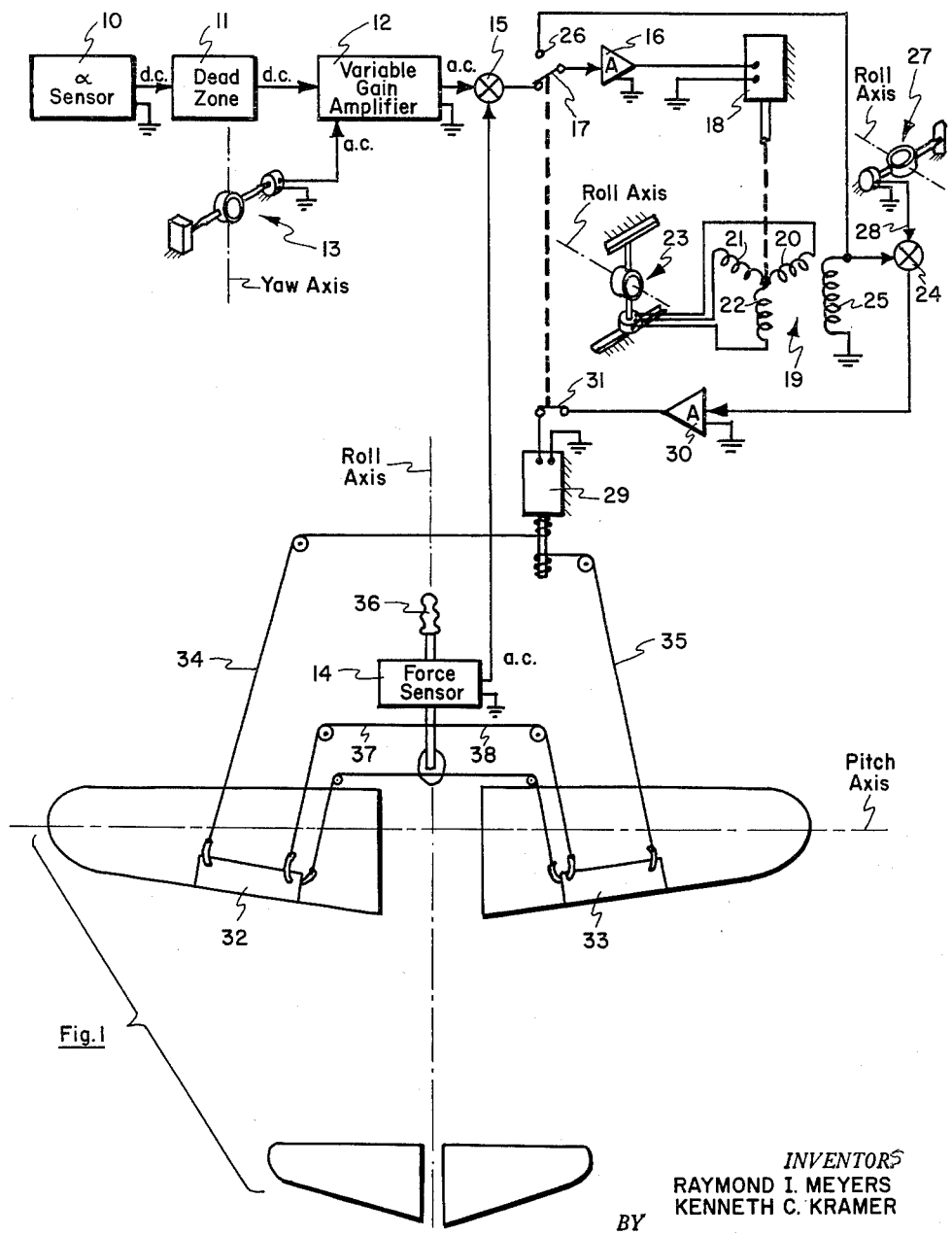
FIG. 1 is a schematic of the preferred embodiment of the present invention.
Figure 2:
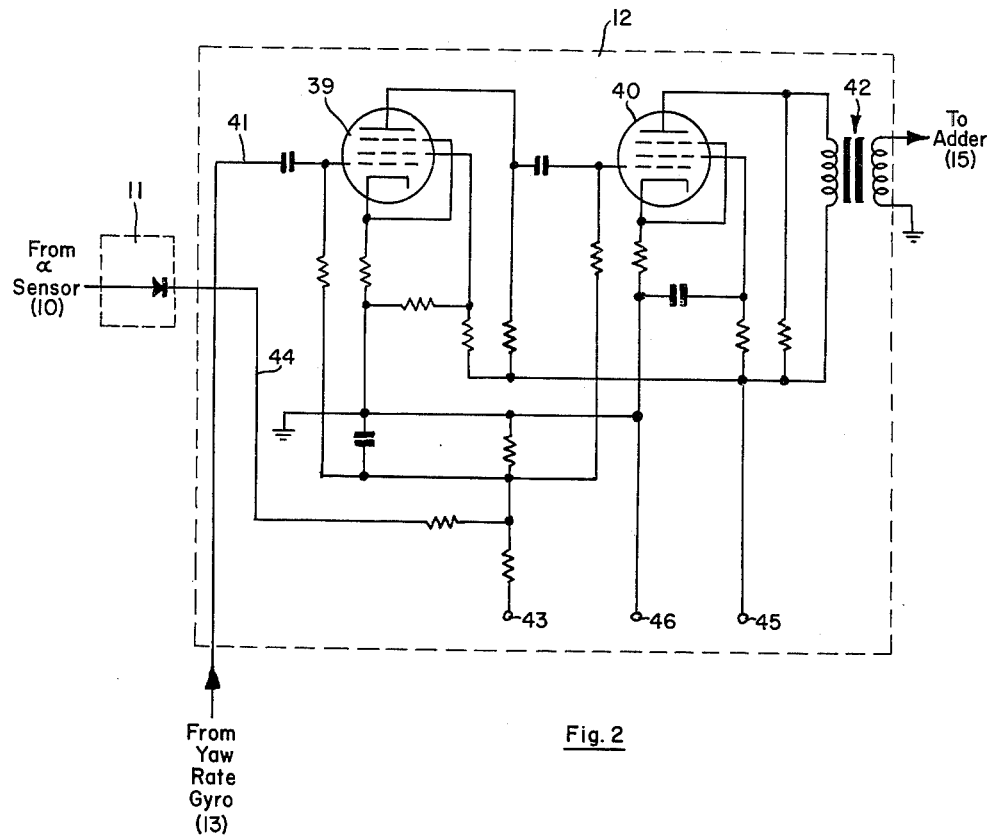
FIG. 2 is a schematic of the automatic gain control amplifier.
Figure 3:
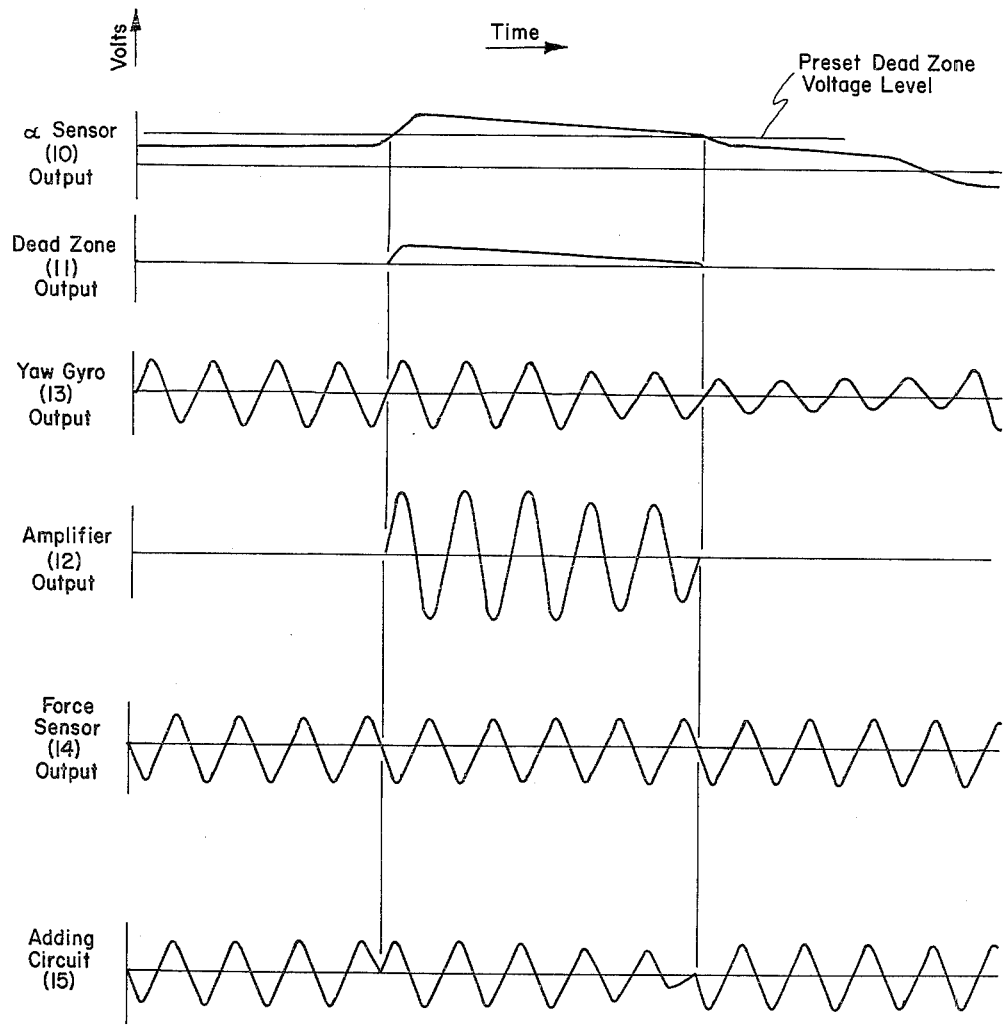
FIG. 3 is an illustration of typical wave forms at different points of the circuit.

Referring now to FIGS. 1 and 3, and angle of attack sensor, hereinafter referred to as an $\alpha$ sensor 10, is positioned to sense the angle of attack of the aircraft. The $\alpha$ sensor emits a direct current signal, as shown in FIG. 3, as a function of the magnitude and direction of the angle of attack of the aircraft. In other words, a nose-up pitch angle causes a positive direct current signal to be emitted by the $\alpha$ sensor 10 and a nose-down pitch angle causes a negative D.C. signal to be emitted by the $\alpha$ sensor 10. The $\alpha$ sensor 10 may be of the type described in U.S. Patent 2,626,115 entitled "Aircraft Controls" by J. L. Atwood et al. and issued on January 20, 1953. A dead zone network 11 is electrically connected to receive the output of the $\alpha$ sensor 10. The dead zone network 11 allows an output of direct current electrical signals above a preset voltage magnitude. A typical dead zone network in its simplest form may be a zenor diode, as shown in FIG. 2, set to conduct at a given positive voltage level. An amplifier 12 is electrically connected to receive the output of the dead zone 11 such that the gain of amplifier 12 is a function of the output of dead zone 11. A yaw rate gyro 13 senses the rate of turn of the aircraft and transmits an A.C. electric signal, as illustrated in FIG. 3, proportional thereto to the amplifier 12. The output of the yaw rate gyro 13 is proportional in magnitude to the rate of turn of the aircraft. The output of the amplifier 12 is consequently a function of the electrical outputs of the shaping circuit 11 and the yaw rate gyro 13. A stick force sensor 14 of the type described in U.S. Patent No. 2,408,770, issued October 8, 1946, to C. A. Frische et al. is positioned to sense the force applied to the control stick in a plane perpendicular to the longitudinal axis and is capable of emitting an A.C. electrical signal proportional in magnitude to the force applied to the stick in a plane perpendicular to the longitudinal axis of the aircraft. The output of the stick force sensor 14 is phase sensitive, i.e., when the pilot applies a force to bank the aircraft to the right, the output of the force sensor 14 is in phase. Conversely, when the pilot applies a force to bank the aircraft to the left, the output of the stick force sensor 14 is 180° out of phase.

The yaw rate gyro output is just the opposite to the output of the force sensor 14, i.e., when the aircraft is turning to the right, the output of the yaw gyro is out of phase. When the aircraft is turning to the left, the output of the yaw gyro is in phase. The reason for the output of the yaw rate gyro being opposite the output of the force sensor in FIG. 3 is that the yaw rate gyro output is actually a leveling signal and the $\alpha$ sensor 10 determines how much of the leveling signal will be applied to the surface controls. An adding circuit 15 is electrically connected to receive and add the outputs of the stick force sensor 14 and the amplifier 12 as shown in FIG. 3. An amplifier 16 receives signals from the adding circuit 15 by way of switch 17. A reversible alternating current motor 18 is connected and responsive to the output of amplifier 16. A resolver 19 has its rotor windings 20, 21 and 22 mechanically connected to the output shaft of motor 18. A roll attitude reference 23 of the vertical gyro type is electrically connected to the rotor windings of resolver 19. The output of the roll attitude reference is an alternating current electrical signal proportional in magnitude to the displacement of the aircraft about the roll axis. A second adding circuit 24 is electrically connected to receive signals picked up by the stator winding 25 of resolver 19. The output of the secondary winding 25 is also electrically connected to the second side 26 of switch 17. A roll rate sensor 27 senses the rate of roll of the aircraft and emits an alternating current signal proportional thereto to the adding circuit 24 by way of the electrical lead 28. A reversible alternating current motor 29 is electrically connected and responsive to the output of the adding circuit 24 by way of the amplifier 30 and switch 31. Switches 17 and 31 are mechanically connected and as shown in FIG. 1 are in the "On" position. The control surfaces 32 and 33 are mechanically connected to the output of the motor 29 by way of cables 34 and 35, respectively. The control stick 36 is also connected to the aileron surfaces 32 and 33 by way of cables 37 and 38, respectively.

FIG. 2 shows a schematic of a two stage amplifier provided with means for controlling the gain from an external source. The tubes 39 and 40 are of the variable gain pentode type. The output from the yaw rate gyro 13 is electrically connected by way of line 41 to the tube 39. The amplified output of tube 39 is resistor capacitor coupled to the input of the second amplifier tube 40. The output of tube 40 is coupled to the transformer 42 with output of the transformer 42 being the output of the variable gain amplifier. The gain of both the amplifying tubes 39 and 40 is controlled by the negative bias applied at point 43 and the signal from the dead zone 11 entering on line 44. Lines 45 and 46 have a positive and negative potential respectively applied thereto to supply the amplifying power to the tubes 39 and 40. The bias is set such that when there is no signal from the dead zone 11 the negative bias provides for a very small amplification or no amplication at all of the yaw rate gyro signal entering on line 41. However, if a positive signal from the dead zone 11 enters on line 44, the positive signal reduces the negative signal to the grid of tubes 39 and 40 and thereby increases the amplification of the two tubes 39 and 40. It is obvious then that the gain of the variable gain amplifier 12 is controlled by the signal from the dead zone 11, and the signal from the yaw rate gyro 13 is amplified by the variable gain amplifier 12.

In an aircraft using automatic controls, the turn conditions are standard and automatic, i.e., coordinated so that for a given turn rate the aircraft will roll or bank a given amount to avoid a flat turn or an overly steep turn. Also, as a basic principle of aircraft flight, an aircraft cannot bank without having a yaw (turn) rate unless the aircraft were to side slip. However, it is common practice when using automatic flight controls to include some means of detecting side slip and to take action to prevent side slip. A typical side slip detector would be a lateral accelerometer. Therefore, it is possible when using automatic flight controls to determine the roll angle from the yaw or turn rate since the signal emitted by the yaw rate gyro 13 is actually a function of the displacement about the roll axis.

Referring now to FIGS. 1 and 2 for a description of the operation of the invention, consider first that the pilot is not exerting a force on the stick control 36 and therefore the adder 15 does not receive any signal from the stick force sensor 14. Assume also that the switch 17 is in the "On" position as shown in FIG. 1. The α sensor 10 emits a D.C. electrical signal proportional to the angle of attack of the aircraft. If this signal from the α sensor 10 is above a preset value, the dead zone circuit 11 will allow that portion of the signal above the preset value to pass to the gain control of the amplifier 12. Hence, the signal from the dead zone circuit 11 determines the amplification of the signal from the yaw rate gyro 13. This signal from the amplifier 12 is a leveling signal and enters adder 15. With no signal from the stick force sensor 14 to compare with the signal from amplifier 12, the adder 15 merely transmits the leveling signal from the amplifier 12 to the motor 18 by way of the amplifier 30 and switch 17. The motor responds by causing an unbalance in the resolver 19 thereby causing a signal to be picked up by the secondary coil 25. This signal is transmitted to the mixer 24 and is compared with the signal, if any, from the roll rate sensor 27. The resultant signal then operates motor 29 which in turn actuates the aileron surfaces 32 and 33 to bring about a level condition of the aircraft.

When the aircraft is in a safe angle of attack and the switch 17 is on, the pilot controls the aileron surfaces without any suppression because the signal from α sensor 10 is below the predetermined level and does not pass through the dead zone circuit 11 and consequently the gain of amplifier 12 is zero and no signal passes to the adder 15 from the yaw rate gyro 13. If, however, the aircraft is in a critical angle of attack and the pilot applies a lateral force to the stick control 36 to maintain the displacement about the roll axis, then the signal proportional to his force, as emitted by the stick force sensor 14, is compared with the leveling signal from the amplifier 12 and the difference is transmitted to the aileron servo circuit as described above. In other words, if the pilot applies enough force to the control stick, the signal from the stick force sensor 14 will override the leveling signal from the amplifier 12 and will maintain the aircraft in its present roll condition; but the pilot is aware of the existing critical condition because of the added force he must apply to the control stick in order to override the leveling signal. Note that if the switch 17 is in the alternate or "Off" position the switch 31 is also in the "Off" position and output of the resolver 19 is fed back to the motor 18 to keep the resolver 19 synchronized with the roll attitude reference signal.

Although the invention has been described and illustrated in detail, it is to be clearly understood that the same is by way of illustration and example only and is not to be taken by way of limitation, the spirit and scope of this invention being limited only by the terms of the appended claims.

We claim:

1. In an aircraft having roll control surfaces and roll control actuating apparatus, roll stabilizing apparatus comprising a first means for generating a first electrical signal in response to the angle of attack of said aircraft, second means for generating a second electrical signal proportional to the rate of turn of said aircraft, variable gain amplification means connected and responsive to the output of said first and second means such that said first electrical signal determines the amplification of said second electrical signal when said first electrical signal amplitude exceeds a given amplitude and means for transmitting said amplified second signal to said roll control actuating apparatus.

2. Aircraft stabilizing apparatus comprising first means generating a first electrical signal in response to any angle of attack of said aircraft in excess of a predetermined angle of attack, second means for generating a second electrical signal proportional to the rate of turn of said aircraft, signal control means connected to said first and second means and responsive to said first and second electrical signals such that the output of said signal control means is a function of said rate of turn signals when said first electrical signal amplitude exceeds a given amplitude, a control stick and control stick pressure sensing means having an electrical output proportional to the force applied to said control stick, electrical adding means connected and responsive to said signals from said signal control and said pressure sensing means and aircraft control means responsive to the output of said comparing means.

3. Aircraft stabilizing apparatus comprising means generating an electrical signal in response to any angle of attack of said aircraft in excess of a predetermined safe operating angle of attack, means for generating an electrical signal proportional to the rate of turn of said aircraft, signal control means connected and responsive to said angle of attack signals, said signal control means being electrically connected to receive said rate of turn signals and having an output which is a function of said rate of turn signals and said angle of attack signals when said angle of attack signals are in a given amplitude range, a control stick, force sensing means capable of sensing force applied to said control stick in a plane perpendicular to the longitudinal axis and emitting a signal proportional to said force applied to said control stick, electrical adding means electrically connected to said signal control and said force sensor for electrically adding said signals from said signal control and said force sensor, an aircraft roll control means electrically connected and responsive to the output of said adding means, said output of said adding means causing an artificial feel to be transmitted to said control stick because of the added force required on the control stick to override the signal from said signal control means.

4. Means for stabilizing aircraft about the roll axis comprising a control stick, roll control surfaces mechanically connected and responsive to movement of said control stick, force sensing means connected to said control stick such that said sensing means emits an electrical signal proportional to the force applied to said control stick, first means for generating an electrical signal proportional in magnitude to the angle of attack of said aircraft and circuit means electrically connected to receive the output of said first means, said circuit means having an output only when said electrical signals from said first means are larger than a predetermined magnitude, a variable gain amplifier connected to said circuit means such that the gain of said variable gain amplifier is a function of the output of said circuit means, second means for generating an electrical signal proportional in magnitude to the rate of turn of said aircraft, the output of said second means being connected to the input of said variable amplifier, first adding means electrically connected to add the electrical signals from said sensing means and said variable gain amplifier, a first motor connected and responsive to the output of said adding circuit means, a resolver having its rotor mechanically connected to the output of said motor, a roll attitude reference means generating an electrical signal proportional to the displacement of said aircraft about said roll axis with respect to level flight of said aircraft, the output of said reference means being coupled to the rotor of said resolver, roll rate sensing means capable of emitting an electrical signal proportional in magnitude to the rate of roll of the aircraft, second adding means electrically connected to the output of said resolver and said roll rate sensor, and a second motor mechanically connected to said control surfaces, said motor being connected and responsive to the output of said resolver such that said motor drives said roll control surfaces.

References Cited in the file of this patent
UNITED STATES PATENTS
2,798,682  Alderson et al. _ _ _ _ _ _ _ _ _ _  July 9, 1957